(12) United States Patent
Houston et al.

(10) Patent No.: US 8,723,500 B2
(45) Date of Patent: May 13, 2014

(54) SYSTEM AND METHOD FOR PREVENTING CONTROLLER INDUCED PULSE SKIPPING AT LOW DUTY CYCLE OPERATIONS

(75) Inventors: Michael Jason Houston, Cary, NC (US); Weihong Qiu, San Jose, CA (US); Emil Chen, Mountain View, CA (US)

(73) Assignee: Intersil Americas Inc., Milpitas, CA (US)

( * ) Notice: Subject to any disclaimer, the term of this patent is extended or adjusted under 35 U.S.C. 154(b) by 276 days.

(21) Appl. No.: 13/235,586

(22) Filed: Sep. 19, 2011

(65) Prior Publication Data

US 2012/0229113 A1    Sep. 13, 2012

Related U.S. Application Data

(60) Provisional application No. 61/451,703, filed on Mar. 11, 2011.

(51) Int. Cl.
*H02M 3/156* (2006.01)

(52) U.S. Cl.
USPC .......................... 323/285; 323/286

(58) Field of Classification Search
USPC .................................. 323/284–288
See application file for complete search history.

(56) References Cited

U.S. PATENT DOCUMENTS

2008/0122422 A1*   5/2008   Zhang et al. ................. 323/351

* cited by examiner

*Primary Examiner* — Harry Behm
*Assistant Examiner* — Matthew Grubb
(74) *Attorney, Agent, or Firm* — Fogg & Powers LLC

(57) ABSTRACT

A voltage regulator generates a regulated output voltage responsive to an input voltage and drive control signals. An error amplifier generates an error voltage signal responsive to the regulated output voltage and a reference voltage. A PWM modulator generates a PWM control signal responsive to the error voltage signal, a ramp voltage and an inverse of the reference voltage. Control circuitry within the PWM modulator maintains the error voltage signal applied to the PWM modulator at substantially a same DC voltage level over the reference voltage operating range and maintains the error voltage signal above a minimum value of the ramp voltage. Driver circuitry generates the drive control signals responsive to the PWM control signal.

19 Claims, 5 Drawing Sheets

SYSTEM AND METHOD FOR PREVENTING CONTROLLER INDUCED PULSE SKIPPING AT LOW DUTY CYCLE OPERATIONS

CROSS-REFERENCE TO RELATED APPLICATIONS

This application claims priority to U.S. Provisional Application No. 61/451,703, filed on Mar. 11, 2011, entitled SYSTEM AND METHOD FOR PREVENTION OF CONTROLLER INDUCED PULSE SKIPPING WITHIN VOLTAGE REGULATORS AT LOW DUTY CYCLE OPERATION, which is incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
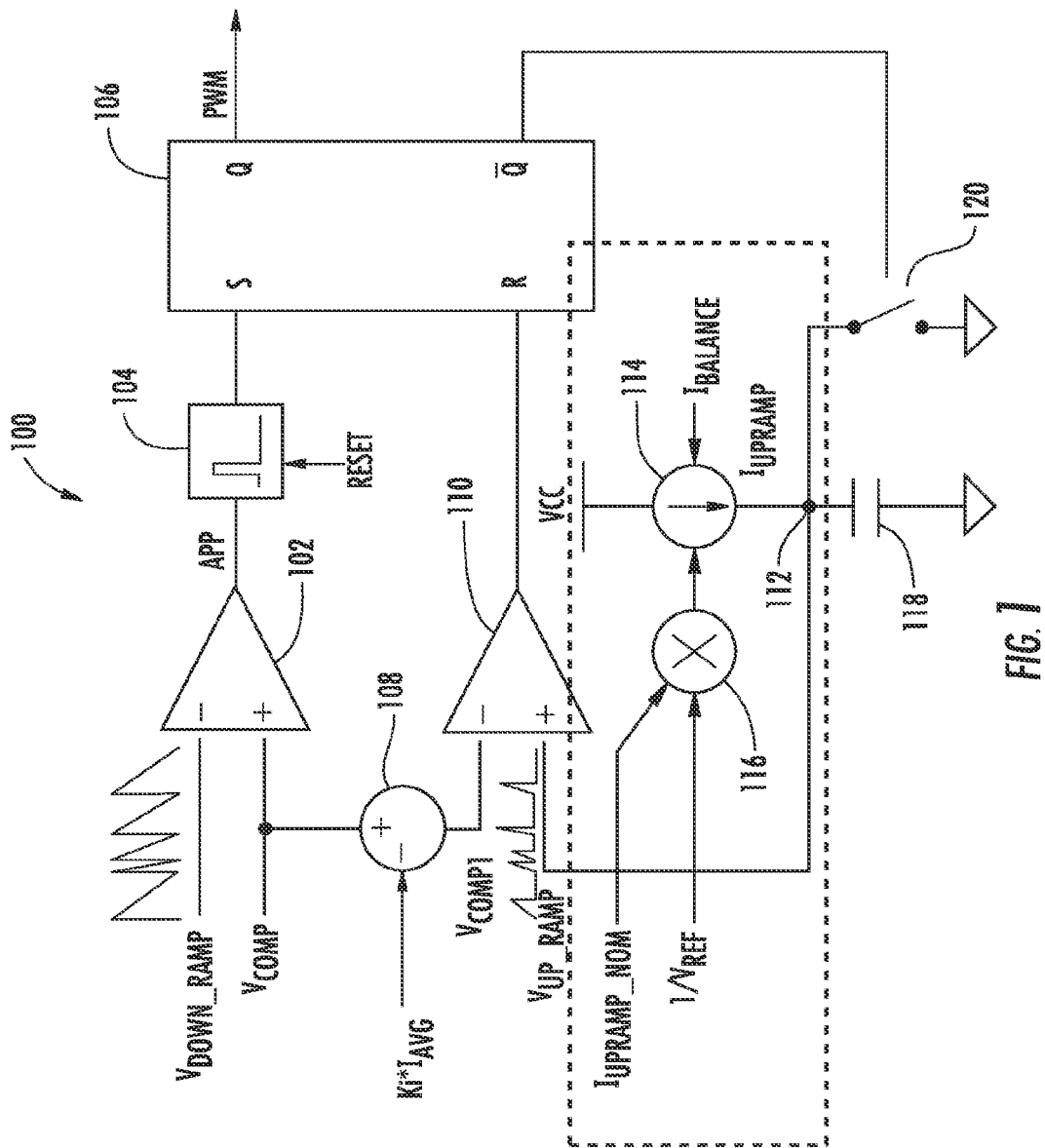
FIG. 1 illustrates a modulator for producing the PWM signal according to the present disclosure.

Referring now to the drawings, wherein like reference numbers are used herein to designate like elements throughout, the various views and embodiments of a system and method for preventing controller induced pulse skipping at low duty cycle operations are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a block diagram of a PWM modulator 100 that limits or eliminates pulse skipping events within a voltage regulator. A first comparator 102 receives the ramp voltage signal $V_{DOWN\_RAMP}$ at its non-inverting input. The $V_{DOWN\_RAMP}$ signal sets the steady state PWM switching frequency. When this down ramp signal crosses below VCOMP, the PWM signal is turned on. The first comparator 102 additionally receives the error voltage signal $V_{COMP}$ at its non-inverting input. The output of the comparator 102 is provided to a pulse generation circuit 104 that generates an output pulse responsive to the output of the comparator 102 going to a logical "high" level. The output of the pulse generation circuit 104 is connected to the S input of the SR latch 106.

Figure 2:
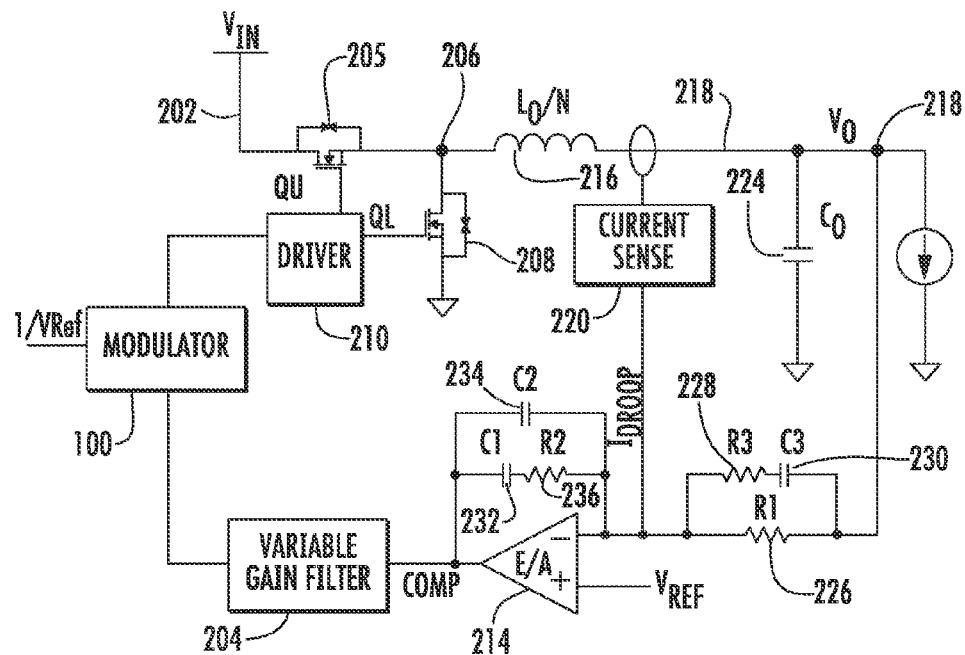
FIG. 2 illustrates the implementation of a voltage regulator and controller including a variable high pass filter.

The error voltage $V_{COMP}$ is also applied to a first input of a summation circuit 108. The other input of the summation circuit 108 receives a current sensing signal $K_i \times I_{average}$. This current sensing signal comprises the current sense signal from the current sense circuit 220 (FIG. 2). The current sense signal is subtracted from the error signal $V_{COMP}$ by the summation circuit 108 to generate a signal $V_{COMP1}$. The new signal $V_{COMP1}$ is provided to the inverting input of a second comparator 110. The non-inverting input of the second comparator 110 receives a signal $V_{UP\_RAMP}$ that is generated at a node 112. The $V_{UP\_RAMP}$ signal begins charging when the PWM signal is turned on. When the $V_{UP\_RAMP}$ signal crosses above the signal VCOMP1, the PWM signal turns off. The $V_{UP\_RAMP}$ is the main ramp signal that determines where the control signal COMP operates. Thus, when a 1/VREF multiplier is multiplied by the nominal UP_RAMP slew rate ($I_{UPRAMP\_NOM}$), the RAMP signal for the rest of discussion can be considered to be the $V_{UP\_RAMP}$ since this is what is being multiplied by 1/VREF. The output of the comparator 110 is provided to the R input of the SR latch 106.

The $V_{UP\_RAMP}$ signal generated at node 112 is generated responsive to a current source 114 that is sourced into the node 112 responsive to a current control signal $I_{BALANCE}$. The current source 114 is additionally responsive to an output of a multiplier circuit 116. The multiplier circuit 116 combines the $I_{UPRAMP\_NOM}$ control signal and the inverse of the reference voltage $$\frac{1}{V_{REF}}.$$

The $I_{UPRAMP\_NOM}$ control signal sets the nominal voltage slew rate of the $V_{UP\_RAMP}$ signal. To increase the voltage slew rate of the $V_{UP\_RAMP}$ signal, the nominal current $I_{UPRAMP\_NOM}$ control signal is multiplied by $1/V_{REF}$. This corrects the $V_{UP\_RAMP}$ signal slew rate to hold $V_{COMP}$ at the same control signal voltage. Each of these signals is applied to the multiplier circuit 116 and the output of the multiplier circuit is provided as a further control signal to the current source 114. The signal $$\frac{1}{V_{REF}}$$

is a generated gain signal that is multiplied by the nominal up ramp slew rate ($I_{UPRAMP\_NOM}$). As $V_{REF}$ falls, the nominal up ramp slew rate will increase to maintain the error voltage COMP signal at the same DC level over the reference voltage operating range. Thus, the error voltage signal will operate sufficiently above the bottom of the modulator RAMP signal even at low duty cycle operation. This enables the regulator to avoid a pulse skipping condition. The circuit limits or prevents erroneous pulse skipping due to noise and other non-idealities. This happens for low-duty cycle operation where noise can push the COMP signal around the bottom of the ramp. Low duty-cycle operations occur where the output voltage provided from an associated voltage regulator operates at a point very near the minimum voltage level of the ramp signal being applied to the PWM modulator 100. When the output voltage ripple of the voltage regulator is outside of an acceptable window, pulse skipping problems may occur at the output of the PWM modulator 100. The circuit should not prevent a pulse skip during a real situation requiring pulse skipping to maintain voltage regulation. A real pulse skip results in the COMP signal falling below the bottom of the ramp. The variable ramp voltage will maintain the control signal at the same DC level over the reference voltage range. A capacitor 118 is connected between node 112 and ground.

A switch 120 is responsive to the $\overline{Q}$ output of the SR latch 106 and connects node 112 to ground when the switch is closed.

In an alternative embodiment, rather than applying the inverse reference voltage $1/V_{REF}$ to the multiplier 116 in all cases, the value of $1/V_{REF}$ can only be applied only when the output voltage is below some critical threshold level. Thus, there is a break point for $V_{REF}$ where the gain applied to $I_{UPRAMP\_NOM}$ would be $1/V_{REF}$ when the output voltage is below a voltage level N and the gain applied to $I_{UPRAMP\_NOM}$ would be 1 whenever the output voltage is above the voltage level N. The voltage value for N can be selected as appropriate.

The faster ramp slew rate will reduce the overall gain of the modulator 100. In order to compensate for the reduced modulator gain, a variable high pass filter is inserted between the error amplifier and the PWM modulator 100. This will be more fully discussed herein below. The variable gain high pass filter may comprise a number of different configurations as are more fully illustrated in FIGS. 3, 4 and 5. The gain of the variable gain high pass filter will equal to $$\frac{1}{V_{REF}}.$$

The error voltage signal will remain at the same DC voltage level without degrading a dynamic response.

Referring now to FIG. 2, there is illustrated a block diagram of the modulator 100 described with respect to FIG. 1 having the variable gain high pass filter 204 inserted between the error amplifier 214 and the modulator 100. By inserting the variable gain high pass filter 204 between the error amplifier 214 and the modulator 100, the gain reduction caused by the faster ramp slew rate within the modulator 100 is compensated for by the filter 204. The error voltage signal will remain at the same DC voltage without degrading the dynamic response of the modulator 100.

The input voltage $V_{IN}$ is applied at an input voltage node 202. A first switching transistor 205 has its drain/source path connected between node 202 and node 206. A second switching transistor 208 has its drain/source path connected between node 206 and ground. The gates of each of switching transistors 205 and 208 are connected to receive control signals from a driver circuit 210. The driver circuits generate the drive signal QU to transistor 205 and QL to transistor 208 responsive to the PWM control signal from a PWM modulator 200. Diode emulation is achieved by turning off the lower FET, second switching transistor 208, when the load current is detected to be zero.

The regulator further includes an inductor 216 connected between node 206 and node 218. A current sensor 220 monitors the current through the inductor 216 at node 218 and generates an $I_{DROOP}$ current sense signal to the inverting input of the error amplifier 214 at node 222. A capacitor 224 is connected between node 218 and ground. The regulated output voltage $V_{OUT}$ is provided from node 218. The output voltage $V_{OUT}$ is monitored at node 218 through an RC circuit consisting of resistors 226, 228 and capacitor 230. Resistor 226 is connected between node 218 and node 222. In parallel with resistor 226 is a series connection of resistor 228 and capacitor 230 between node 222 and node 218.

The error amplifier 214 compares the monitored output voltage $V_{OUT}$ with a reference voltage $V_{REF}$ that is applied to a non-inverting input of the error amplifier 214. A feedback signal is provided between the output of the error amplifier 214 and its non-inverting input consisting of capacitors 232 and 234 and resistor 236. Capacitor 234 is connected between the output of the error amplifier 214 and the non-inverting input at node 222. Connected in parallel with capacitor 234 are a series connection of capacitor 232 and resistor 236.

Figure 3:
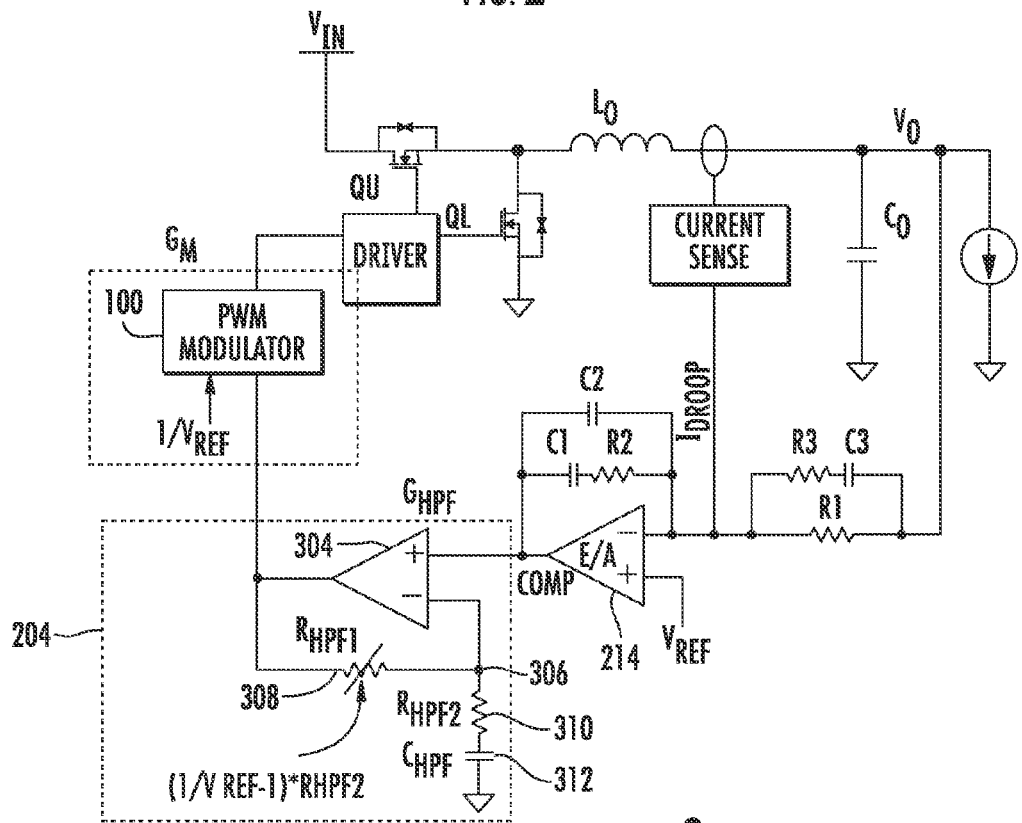
FIG. 3 illustrates a first embodiment of a manner for compensating for the loop gain of the PWM modulator of FIG. 1.

The variable gain high pass filter 204 may be implemented in any number of fashions. Several of these implementations are illustrated with respect to FIGS. 3-5. In the embodiment of FIG. 3, the variable gain high pass filter 204 consists of an amplifier 304 having its non-inverting input connected to receive the error voltage signal (COMP) from the error amplifier 214. The inverting input of the amplifier 304 is connected to node 306. A variable feedback resistor 308 is connected between the output of the amplifier 304 and the inverting input at node 306. The value of the variable resistor is established according to the equation $(1/V_{REF}-1)\times R_{HPF2}$. Connected in series between node 306 and ground are a resistor 310 and a capacitor 312.

Figure 4:
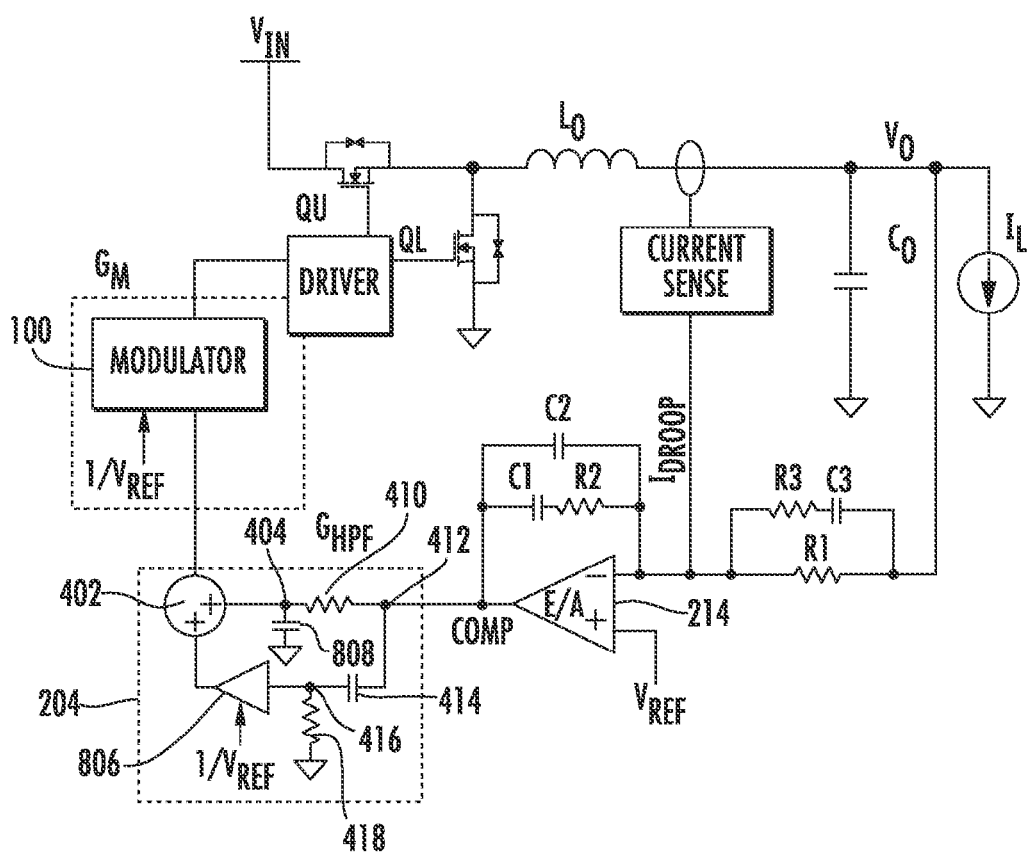
FIG. 4 illustrates an alternative embodiment for compensating for the loop gain associated with the PWM modulator of FIG. 1.

Referring now to FIG. 4, there is illustrated a second embodiment of the variable gain high pass filter implemented within the voltage regulator. In this embodiment, the variable gain high pass filter 204 includes a summation circuit 402 having a first input connected to node 404 and a second input connected to the output of an amplifier 406. A capacitor 408 is connected between node 404 and ground. A resistor 410 is connected between node 404 and node 412. Node 412 is connected to the output of the error amplifier 214 to receive the error voltage signal. Capacitor 414 is connected between node 412 and node 416. A resistor 418 is connected between node 416 and ground. The input of the amplifier 406 is connected to node 416. The amplifier 406 receives a control input of $$\frac{1}{V_{REF}}.$$

The output of the summation circuit 402 is connected to the input of the PWM modulator 100.

Figure 5:
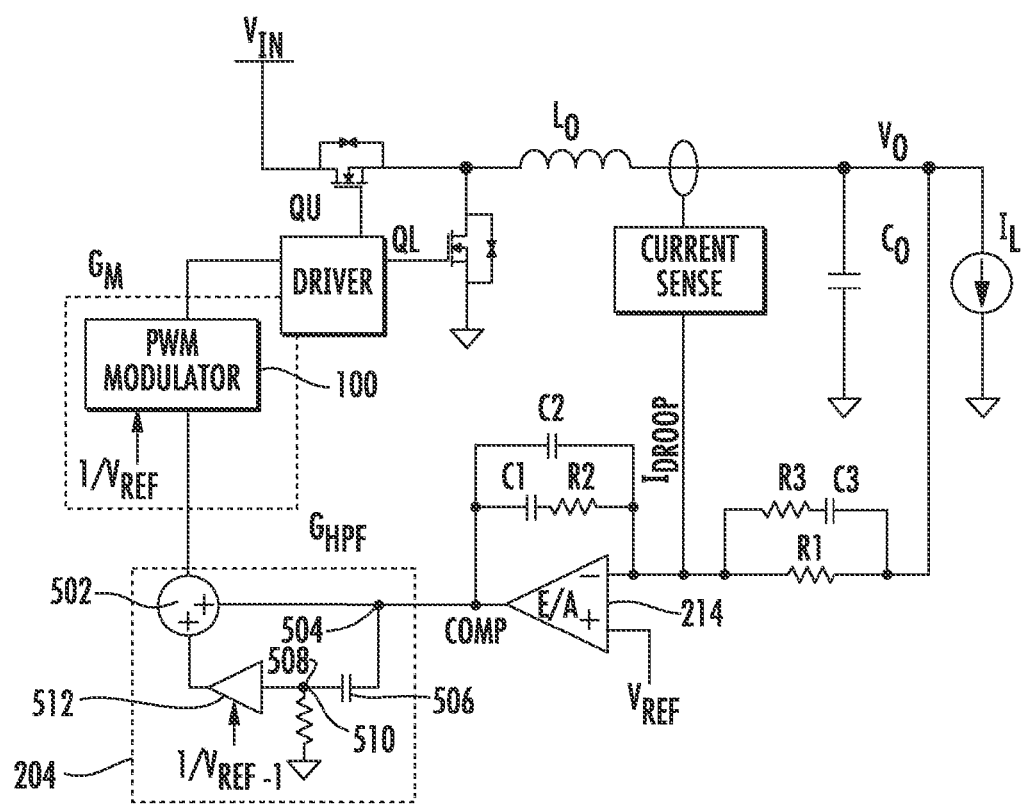
FIG. 5 illustrates yet a further embodiment of a manner for compensating for the loop gain for use with the PWM modulator of FIG. 1.

A third embodiment is illustrated with respect to FIG. 5. The implementation of FIG. 5 includes the summation circuit 502 having its output providing an input to the PWM modulator 100. A first input of the summation circuit 502 is connected to node 504. Node 504 is connected to receive the error voltage signal from the output of the error amplifier 214. A capacitor 506 is connected between node 504 and node 508. A resistor 510 is connected between node 508 and ground. The second input of the summation circuit 502 is connected to the output of an amplifier 512. The amplifier 512 has its input connected to node 508 and also receives a control signal $$\frac{1}{V_{REF}}-1$$

as a control input. The $$\frac{1}{V_{REF}}-1$$

signal comprises a gain control signal for the amplifier 512.

Using the variable up ramp slew rate within the modulator 100 and the variable gain high pass filter 204, the COMP voltage remains flat over the output voltage range. There is no degradation in transient performance when the variable gain high pass filter 204 is included. The circuits of FIGS. 1-5 provide a simple way to limit or prevent controller induced pulse skipping during low duty cycle operation. The circuit also provides a way to maintain optimal dynamic performance with variable modulator gain. This improves regulation and stability of a voltage regulator by preventing pulse skipping during low duty cycle operation. The circuit provides a simple way to prevent controller induced skipping at low duty cycle operation. Existing solutions for providing these abilities increase the BOM costs of the voltage regulator by adding components to the board to improve regulation during low duty cycle operation.

Figure 6:
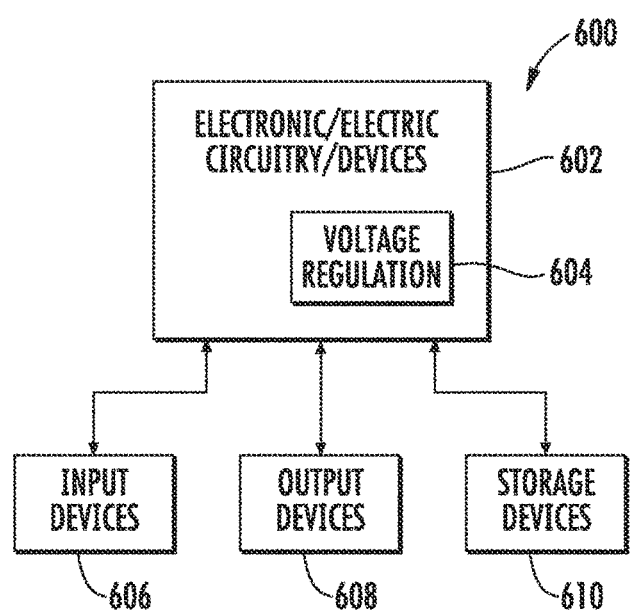
FIG. 6 illustrates an electronic/electric system including electronic/electric circuitry including the switching circuitry of FIGS. 1-5 according to one embodiment.

Voltage regulators and associated circuitry according to the embodiments of the present disclosure can be embodied as a variety of different types of electronic devices and systems, such as computers, cellular telephone, personal digital assistants, and industrial systems and devices. More specifically, some applications include, but are not limited to, CPU power regulators, chip regulators, point of load power regulators and memory regulators. FIG. 6 is a block diagram of an electronic/electric system 600 including electronic/electric circuitry/devices 602 including the voltage regulation circuitry 604 as described with respect to FIGS. 1-5. The electronic/electric circuitry/devices 602 include circuitry for performing various functions required for the given system, such as executing specific software to perform specific calculations or tasks where the electronic system is a computer system. In addition, the electronic/electric system 600 may include one or more input devices 606, such as a keyboard, mouse or touchpad coupled to the electronic circuitry/device 602 to allow an operator to interface with the system. Typically, the electronic/electric system 600 also includes one or more output devices 608 coupled to the electronic/electric circuitry/device 602, such output devices typically including a video display such as a LCD display. One or more data storage devices 610 are also typically coupled to the electronic/electric circuitry/device 602 to store data or retrieve data from storage media. Examples of typical storage devices 610 include magnetic disc drives, tape cassettes, compact discs read only (CD ROMS) and compact discs (CD R/W) memories, and digital video discs (DVDs), flash memory drives, and so on.

It will be appreciated by those skilled in the art having the benefit of this disclosure that this system and method for preventing controller induced pulse skipping at low duty cycle operations provides a system and method for eliminating pulse skipping in a voltage regulator. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus, comprising:
  a voltage regulator for generating a regulated output voltage responsive to an input voltage and drive control signals;
  an error amplifier for generating an error voltage signal responsive to the regulated output voltage and a reference voltage;
  a variable gain filter for amplifying the error voltage signal by a gain substantially proportional with an inverse of the reference voltage;
  a PWM modulator for generating a PWM control signal responsive to the error voltage signal, a ramp voltage and the inverse of the reference voltage;
  control circuitry within the PWM modulator for maintaining the error voltage signal applied to the PWM modulator at substantially a same DC voltage level over the reference voltage operating range and maintaining the error voltage signal above a minimum value of the ramp voltage; and
  driver circuitry for generating the drive control signals responsive to the PWM control signal.

2. The apparatus of claim 1, wherein the variable gain filter is a high pass filter that is responsive to a variable gain control signal.

3. The apparatus of claim 1, wherein the variable gain filter is a high pass filter that maintains the error voltage signal at a same DC voltage level.

4. The apparatus of claim 1, wherein the PWM modulator further comprises:
  a latch circuit for generating the PWM control signal responsive to a pulse output and a first control signal;
  a first comparator for generating a first output responsive to the ramp voltage and the error voltage signal;
  a pulse generator circuit for generating the pulse output responsive to the first output; and
  a second comparator for generating the first control signal responsive to a comparison of a combination of the error voltage signal and a current sense signal with a second ramp signal.

5. The apparatus of claim 4, wherein the control circuitry further includes:
  a multiplier for multiplying an inverse of the reference voltage by a nominal up ramp slew rate signal; and
  a current source for generating the second ramp signal at a node associated with the current source responsive to a balance current and an output of the multiplier.

6. The apparatus of claim 1 further including a current sensor for generating a current sense signal that is applied to the regulated output voltage.

7. A method for generating a PWM control signal, comprising:
  generating an error voltage signal responsive to a regulated output voltage and a reference voltage;
  comparing a ramp voltage with the error voltage signal and generating a pulse signal responsive thereto;
  modifying the error voltage signal responsive to a current sense signal;
  generating a first voltage responsive to an inverse of the reference voltage and a nominal upramp slew rate signal;
  comparing the modified error voltage signal with the first voltage to generate a first control signal; and
  generating the PWM control signal responsive to the pulse signal and the first control signal.

8. The method of claim 7, wherein the step of generating the first voltage further includes:
  multiplying the nominal upramp slew rate signal with the inverse of the reference voltage to generate a second control signal; and
  controlling a current source responsive to the second control signal and a current control signal to generate the first voltage.

9. The method of claim 7 further including:
applying the PWM control signal to a voltage regulator;
generating drive control signals responsive to the PWM control signal;
generating a regulated output voltage responsive to an input voltage and the drive control signals; and
generating the error voltage signal responsive to the regulated output voltage and the reference voltage.

10. The method of claim 9 further including amplifying the error voltage signal by a gain substantially proportional with an inverse of the reference voltage.

11. The method of claim 10, wherein the amplifying further comprises amplifying the error voltage signal responsive to a variable gain control signal.

12. The method of claim 9 further including:
generating the current sense signal responsive to a current through an inductor of the voltage regulator; and
applying the current sense signal to the regulated output voltage.

13. The method of claim 7, further including maintaining the error voltage signal at a same DC voltage level over an operating range of the reference voltage.

14. The method of claim 7 further including:
generating the current sense signal responsive to a current through an inductor of the voltage regulator; and
applying the current sense signal to the regulated output voltage.

15. A PWM controller for generating a PWM control signal for a voltage regulator, comprising:
a first input for receiving an error voltage signal, wherein the error voltage signal is generated in response to a regulated output voltage and a reference voltage;
a second input for receiving a ramp voltage signal;
a third input for receiving an inverse of the reference voltage;
an output for providing the PWM control signal;
modulator circuitry for generating the PWM control signal responsive to the error voltage signal, the ramp voltage signal and the inverse of the reference voltage, wherein the modulator circuitry includes a circuit for generating the PWM control signal responsive to a pulse output and a first control signal, a first comparator for generating a first output responsive to the ramp voltage signal and the error voltage signal, a pulse generator circuit for generating the pulse output responsive to the first output, and a second comparator for generating the first control signal responsive to a comparison of a combination of the error voltage signal and a current sense signal with a second ramp signal; and
control circuitry for maintaining the error voltage signal applied to the modulator circuitry at substantially a same DC voltage level over the reference voltage operating range and maintaining the error voltage signal above a minimum value of the ramp voltage signal.

16. The PWM controller of claim 15 wherein the control circuitry further comprises:
a multiplier for multiplying the inverse of the reference voltage by a nominal up ramp slew rate signal; and
a current source for generating the second ramp signal at a node associated with the current source responsive to a balance current and an output of the multiplier.

17. The PWM controller of claim 15 wherein the modulator circuitry reduces the gain of the PWM modulator by a factor of the inverse of the reference voltage.

18. A system, comprising:
a voltage regulator for generating a regulated output voltage at an output responsive to an input voltage and drive control signals;
an error amplifier for generating an error voltage signal responsive to the regulated output voltage and a reference voltage;
a variable gain filter for amplifying the error voltage signal by a gain substantially proportional with an inverse of the reference voltage;
a PWM modulator for generating a PWM control signal responsive to the error voltage signal, a ramp voltage and the inverse of the reference voltage, control circuitry within the PWM modulator for maintaining the error voltage signal applied to the PWM modulator at substantially a same DC voltage level over the reference voltage operating range and maintaining the error voltage signal above a minimum value of the ramp voltage;
driver circuitry for generating the drive control signals responsive to the PWM control signal; and
a load coupled to the output of the voltage regulator.

19. The system of claim 18, wherein the load is selected from a group consisting of a processor, a memory, an input device, an output device and a storage device.

* * * * *